United States Patent [19]

Ross, Jr.

[11] 4,194,603
[45] Mar. 25, 1980

[54] TROLLEY RAIL AND FLYING PICKUP

[76] Inventor: Donald R. Ross, Jr., 2301 Morton Rd., Pittsburgh, Pa. 15241

[21] Appl. No.: 941,781

[22] Filed: Sep. 13, 1978

[51] Int. Cl.² ............................................. B60M 1/34
[52] U.S. Cl. .................................. 191/23 A; 191/58; 191/59.1; 191/60.4; 191/74
[58] Field of Search .............. 191/23 A, 24, 35, 45 R, 191/57, 58, 59.1, 60.4, 73, 74

[56] References Cited

U.S. PATENT DOCUMENTS

| | | | |
|---|---|---|---|
| 3,345,471 | 10/1967 | Kilburg | 191/59.1 X |
| 3,590,173 | 6/1971 | Stahmer | 191/35 |
| 3,772,482 | 11/1973 | Ross | 191/23 |

Primary Examiner—Richard A. Schacher
Attorney, Agent, or Firm—Brown, Flick & Peckham

[57] ABSTRACT

A trolley rail housing provided with a plurality of parallel open-bottom slots extending lengthwise thereof has an electric conductor mounted up in each slot, with an end portion of the housing offset upwardly and connected by a downwardly inclined portion to the rest of the housing. An electrical pick-up unit adapted to be carried by a vehicle includes a plurality of collectors mounted for vertical and lateral movement, with spring means urging the collectors upwardly. This unit also includes a pair of laterally spaced guide members disposed above the collectors and movable laterally with them and adapted to engage the opposite sides of the rail housing when the pickup unit, separated from the housing, is moved toward its offset end. The relative positions of the guide members and collectors are such that when the guide members are in engagement with the sides of the housing the collectors will be directly below the housing slots, so that when the guide members are moved inwardly along the housing the collectors will enter the slots in the inclined portion of the housing and engage the conductors.

7 Claims, 5 Drawing Figures

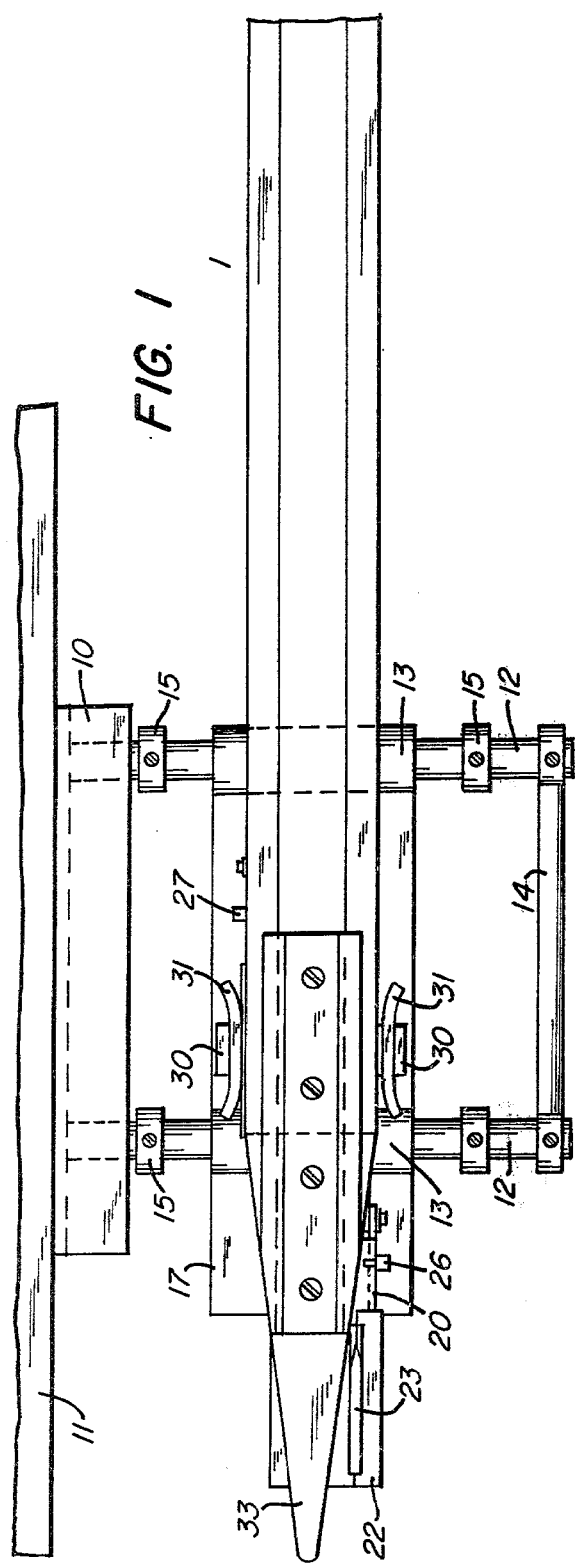
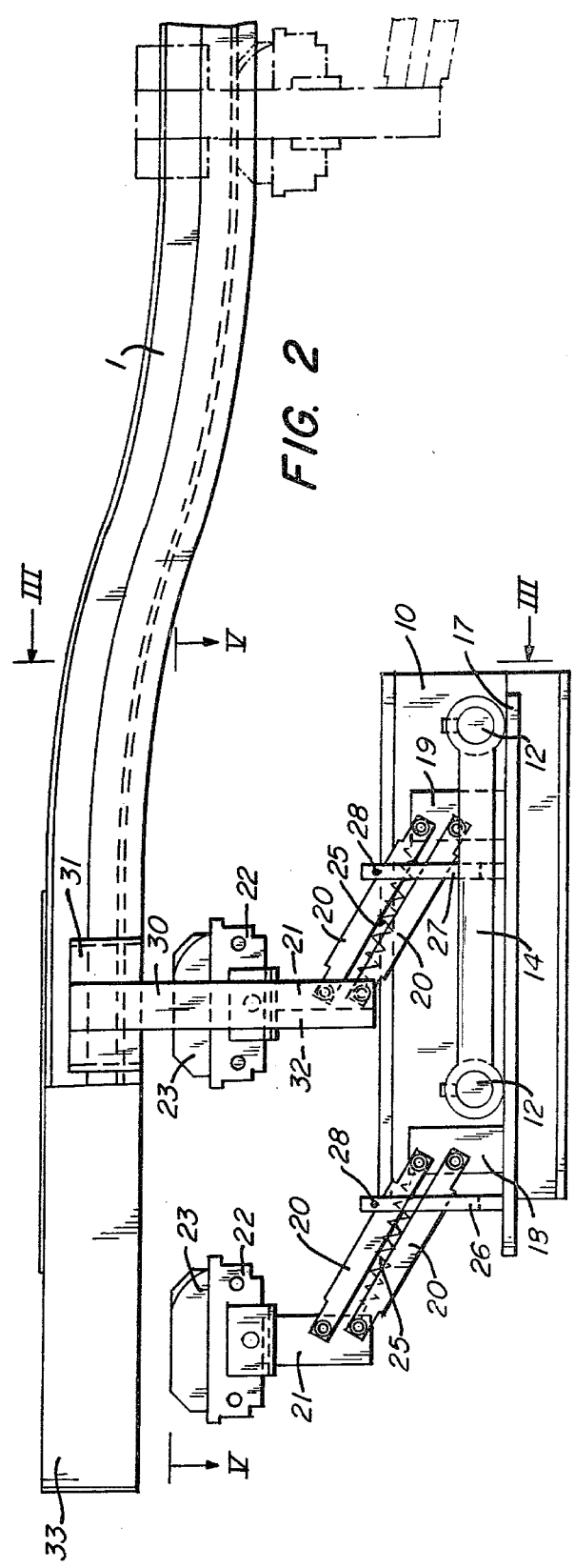

TROLLEY RAIL AND FLYING PICKUP

One type of trolley rail used in connection with cranes and other movable units such as vehicles is formed from a horizontal housing provided in its bottom with parallel slots extending lengthwise of the housing. Electrical conductors are mounted up in the slots and are slidably engaged by collectors carried by an electrical pickup unit that is movable along the rail. When the pickup unit is connected with a vehicle for operating it, it sometimes is desirable to move the vehicle and pickup unit away from the rail, with the vehicle then being driven by batteries, and later return the pickup unit to the rail. Such a pickup unit is referred to herein as a flying pickup. The problem that arises with such a pickup is a matter of aligning it with the end of the rail as it is moved toward the rail.

It is among the objects of this invention to provide a flying pickup and rail so constructed and arranged that as the pickup approaches the end of the rail it will be guided onto it in the correct position for engagement by the pickup collectors with the electrical conductors inside the rail housing.

The preferred embodiment of the invention is illustrated in the accompanying drawings, in which FIG. 1 is a plan view;

FIG. 2 is a side view;

Figure 3:
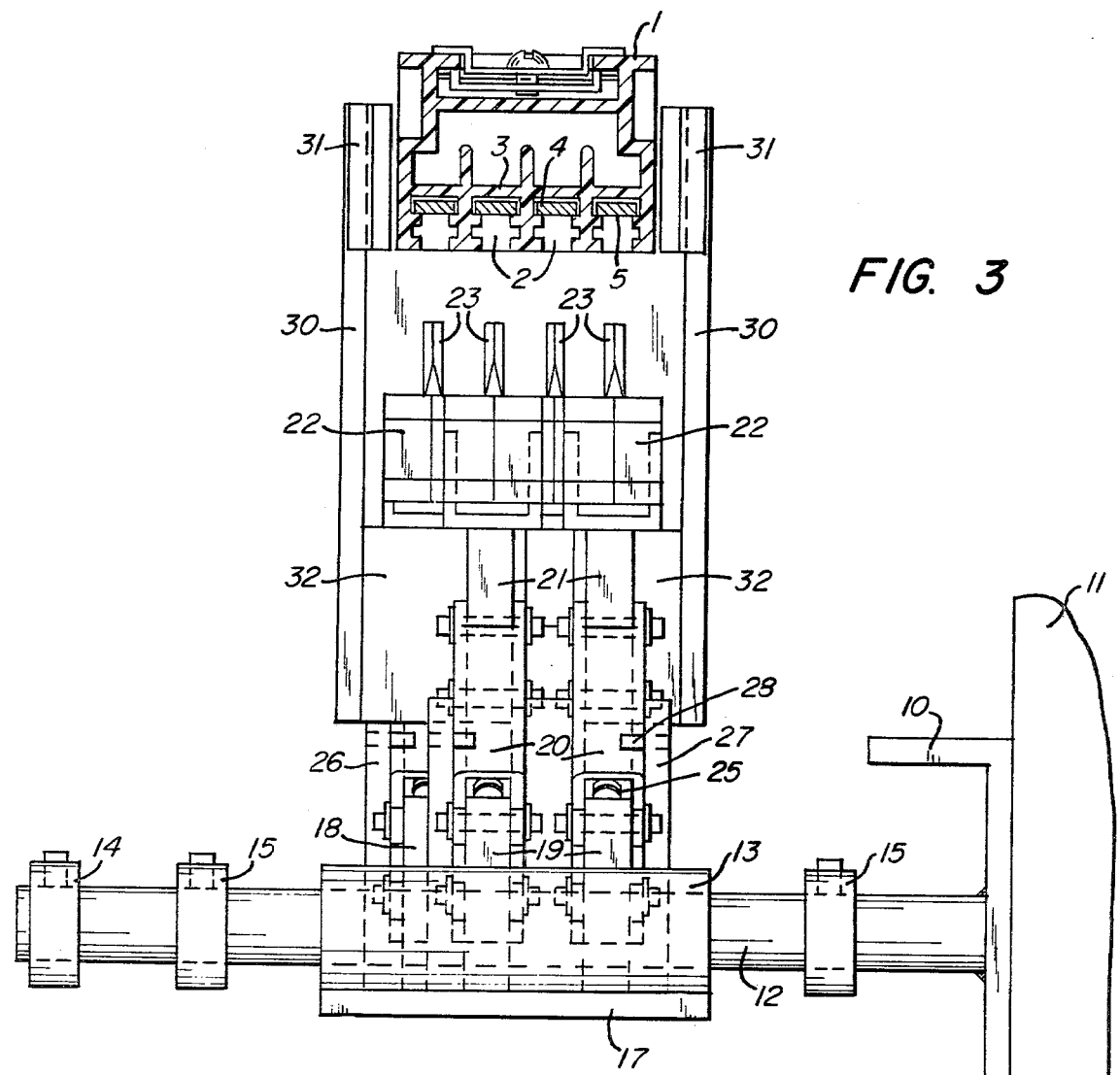
FIG. 3 is an enlarged end view and section taken on the line III—III of FIG. 2.

Referring to FIGS. 1 and 2 of the drawings, a rail is formed from any desired number of rigid rail sections, usually 10 to 20 feet long, extruded from a suitable plastic. High impact polyvinyl chloride is satisfactory. Each rail section includes a housing 1, preferably having a generally rectangular outline in cross section (FIG. 3) and may be tubular to reduce its weight and to provide a duct for wires and liquid conduits and for other purposes. The rail sections are connected end to end. The bottom of the rail is provided with parallel slots 2, as shown in FIG. 3, extending lengthwise of it. There are at least two of these slots, four being shown. The upper sides of the slots are closed by a partition wall 3 that extends across them and forms the lower wall of the tubular portion of the rail. The opposite side walls of each slot are provided directly beneath the partition wall with a pair of opposed grooves 4 extending lengthwise of the rail. Disposed in each of the slots there is a rigid electrical conductor bar 5, the edges of which extend into the grooves to retain the bar in place. The bars are inserted in the grooves from one end of each rail section.

The depth of rail slots 2 is such that the exposed lower surfaces of the conductor bars are spaced a considerable distance upwardly from the bottom of the rail. Consequently, there is little danger of something accidentally coming in contact with the recessed conductor bars. On the other hand, the conductor bars are engaged by electric contact members or collectors that extend up into the slots. These collectors are part of an electric power pickup unit that runs along the rail and that will now be described.

The electrical pickup includes a bracket 10, by which it can be supported at one side of an electrically driven vehicle 11 when the trolley rail is beside the vehicle, or at the upper end of a trolley pole when the rail is located above the vehicle. Extending laterally away from one side of the bracket is a pair of parallel rods 12, on which sleeves 13 are slidably mounted so that they can be moved lengthwise of the rods. The outer ends of the parallel rods may be rigidly connected together by a tie rod 14. Collars 15, adjustable along the rods at the opposite ends of the sleeves, limit the distance that the sleeves can move on the rods. When the pickup is in operating position, the rods are directly below the rail as shown in FIGS. 1 and 3.

Figure 5:
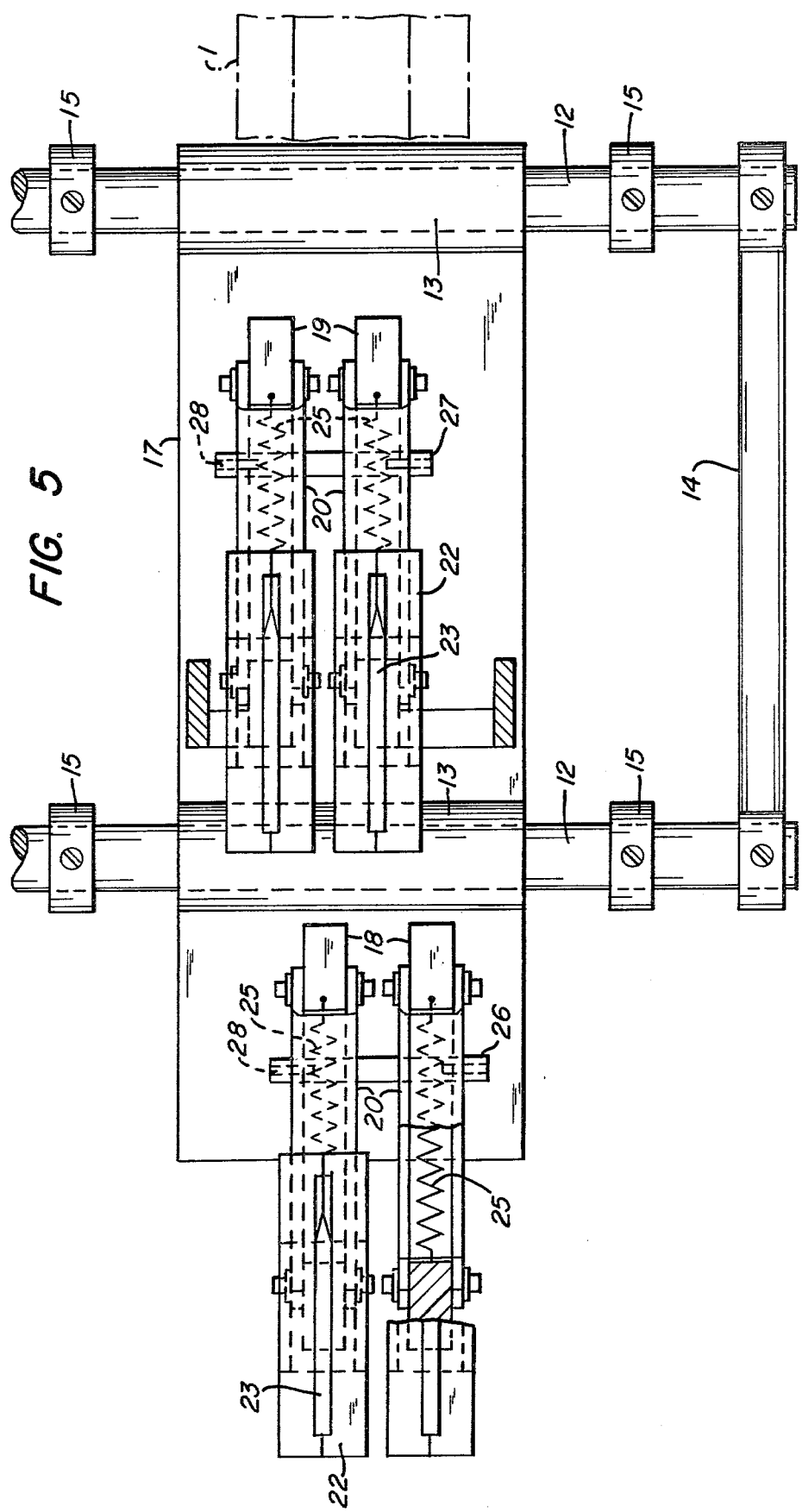
FIG. 5 is an enlarged plan view, partly in section, taken on the line V—V of FIG. 2.

A base plate 17 is welded to the bottoms of the two sleeves 13 and extends out beyond one of them. Rigidly mounted on the plate extension is a pair of laterally spaced parallel metal blocks 18, as shown in FIGS. 2 and 5. Another pair of laterally spaced blocks 19 is rigidly mounted on the base plate near the farther sleeve. These two blocks are staggered relative to the other two. Pivotally connected to each block are the lower ends of parallel upper and lower inclined links 20. All of the links extend in the same direction. The outer ends of the links are pivotally connected to metal blocks 21, each of which supports an insulating holder 22 for a current collector 23. The collectors are connected by wires (not shown) to the electrical drive of the vehicle and to a rechargeable battery on the vehicle for driving it when the pickup is separated from the rail.

The collectors are urged toward an upper position by means of coil springs 25 stretched between the two blocks, to which each pair of links is connected. Preferably, forked vertical members 26 and 27 are rigidly mounted on the base plate and straddle the links to take any side thrust. Pins 28 projecting from these members and overlying the links limit the distance the collectors can rise above the base plate. When the pickup is moving along the rail, the collectors are pressed upwardly into engagement with conductors 5 by means of the coil springs. At such a time, the collectors are pressed down to a lower level than they occupy while they are disengaged from the rail. This lower position is illustrated in dotted lines in FIG. 2.

The pickup that has just been described is designed as a flying pickup that can be moved away from the rail when the vehicle is driven by its battery, and then returned to the rail. To facilitate insertion of the collectors in the rail housing slots 2 when the pickup is moved toward the rail after being separated from it, the end of the rail that the pickup left is offset upwardly as shown in FIG. 2 so that its bottom is above the upper position of the collectors. This upwardly offset end portion is connected by an inclined portion to the rest of the rail.

To guide the collectors into the rail housing slots when the separated pickup is returned to the rail, there are two guide members that are movable laterally with the collectors. Each guide member consists of a vertical bar 30 with a horizontally curved plate 31 secured to its upper end. The two plates are between the bars and are bowed toward each other. Although the lower ends of the bars could be rigidly mounted directly on the base plate 17 of the pickup, that would prevent them from moving vertically, so it is preferred to mount the bars on blocks 32 projecting from the sides of the two upper blocks 21 that are above the base plate between the two sleeves 13, whereby the guides will move up and down with the collectors.

When the pickup has left the rail and is to be returned to it, the driver of the vehicle 11 lines up collectors 23 with the rail slots as best he can as the vehicle approaches the rail. The curved plates 31 of the guide members are at such a height and distance apart that they can engage the opposite sides of the upwardly offset end of the rail as shown in FIGS. 1 and 3. To help guide them into such a position, it is preferred that a wedge 33 clamped onto the rail housing project horizontally from the end of the rail. As the guides move along the opposite sides of this wedge it will move them laterally in one direction or the other as necessary as they approach the rail housing to line them up with the opposite sides of the housing. This lateral movement of the guides is permitted by the sliding of sleeves 13 along rods 12. Since the guides are connected with one pair of collectors and both pairs are supported by base plate 17, the guides will move all of the collectors laterally in unison.

Figure 4:
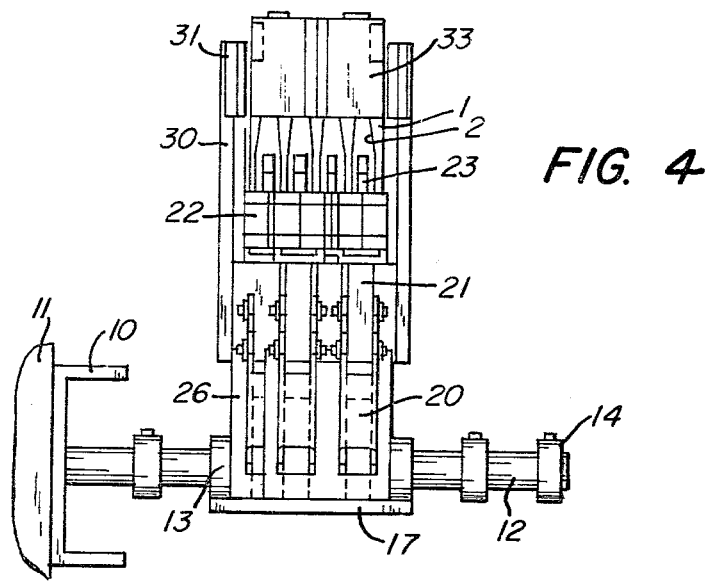
FIG. 4 is a view of the opposite end of the pickup.

When the guides engage the opposite sides of the rail housing, the collectors will be in proper position for entering slots 2 in the inclined portion of the housing. This entering occurs as the guides slide along the rail. Preferably, as shown in FIG. 4, the entrance to the inclined slots is wider than the entrance to the remaining portions of the slots to provide additional clearance for the entrance of the collectors. Continued forward movement of the pickup after the collectors have engaged the inclined portions of conductors 5 will cause the collectors to slide down the conductors to their lower position shown in dotted lines in FIG. 2, which is permitted by the parallel linkage and the springs that support the collectors.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In combination, a substantially horizontal trolley rail housing provided with a plurality of parallel open bottom slots extending lengthwise of the housing, an electric conductor mounted up in each slot and having a downwardly facing collector-receiving surface, an end portion of said housing being offset upwardly and connected by a downwardly inclined portion to the rest of the housing, and an electrical pickup unit adapted to be carried by a vehicle away from said housing and to be returned to it at said offset end, said unit comprising supporting means, a plurality of collectors mounted on said means for vertical and lateral movement relative thereto, spring means urging the collectors upwardly for engaging said conductors when said unit is beneath said housing, and a pair of laterally spaced guide members extending above the level of said collectors and movable laterally therewith, said guide members being adapted to engage the opposite sides of the housing when said unit, separated from the housing, is moved toward said offset end, and the relative positions of said guide members and collectors being such that when the guide members are in engagement with the sides of the housing each collector will be directly below a different one of said slots, whereby when the guide members are moved inwardly along the housing the collectors will enter the portions of said slots in said inclined portion of the housing and engage the conductors.

2. In the combination recited in claim 1, the slots in said inclined portion of the housing being wider than the adjoining portions of the slots.

3. In the combination recited in claim 1, means rigidly connecting said guide members with the underlying collectors so that the guide members move vertically with the collectors.

4. In the combination recited in claim 1, each of said guide members including a vertical bar connected with one of said collectors for movement therewith, and a horizontally curved plate rigidly mounted on the upper end of the bar for engaging a side of said rail housing.

5. In the combination recited in claim 1, a wedge-shape member secured to said offset end of the housing and pointing longitudinally away from it for guiding said guide members into engagement with the opposite sides of the housing.

6. In the combination recited in claim 1, said supporting means including a mounting bracket and parallel rods extending laterally away from one side of it, there being a base member supporting said spring means and collectors and guide members, and means slidably mounting the base member on said rods for movement lengthwise of the rods to permit said lateral movement of the collectors in unison.

7. In the combination recited in claim 6, blocks rigidly mounted on said base member, links pivotally mounted at one end on said blocks, and means pivotally connecting the opposite end of the links to said collectors, said spring means including coil springs urging said opposite end of the links upwardly.

* * * * *